Nov. 2, 1926.  
C. D. McCARTHY  
1,605,677  
CORING DEVICE FOR APPLES AND OTHER ARTICLES  
Filed Oct. 6, 1924
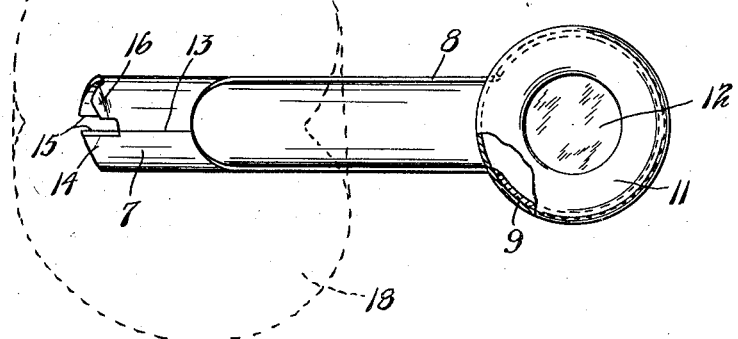
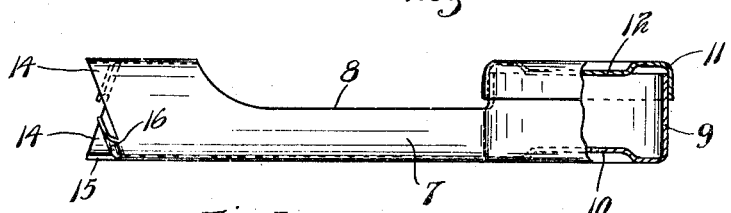
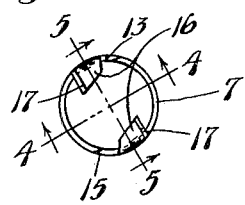
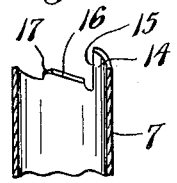
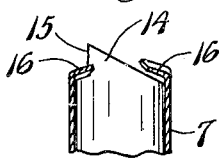
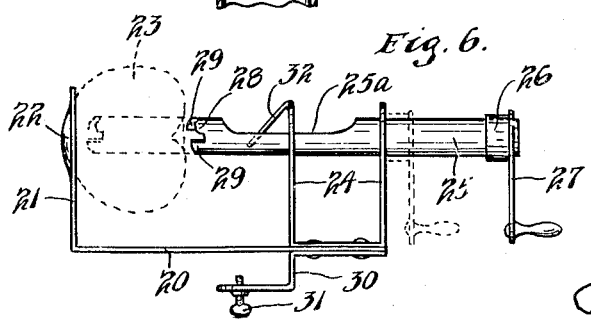
INVENTOR.  
CHARLES D. McCARTHY.  
BY HIS ATTORNEY.  
James F. Williamson Patented Nov. 2, 1926.

1,605,677

UNITED STATES PATENT OFFICE.

CHARLES D. McCARTHY, OF ST. PAUL, MINNESOTA.

CORING DEVICE FOR APPLES AND OTHER ARTICLES.

Application filed October 6, 1924. Serial No. 741,862.

This invention relates to a device for coring fruit and vegetables or in cutting a cylindrical piece therefrom.

It is an object of this invention to provide a simple and efficient device by means of which a substantially cylindrical piece may be cut from a fruit or vegetable and said piece easily removed therefrom.

It is a further object of the invention to provide such a device comprising a tube having at one end cutting edges lying in the sides of the tube and inwardly extending inclined portions having cutting edges.

It is another object of the invention to provide a device, such as set forth in the preceding paragraphs, in combination with a gauge for the fruit or vegetable and a stop means for the said tube for limiting the movement of the tube before its cutting edge has entirely passed through the fruit or vegetable.

These and other objects and advantages of the invention will be fully set forth in the following description made in connection with the accompanying drawings in which like reference characters refer to the same parts throughout the different views, and in which—

Fig. 1 is a plan view of the device, a small portion thereof being broken away and other parts shown in horizontal section;

Fig. 2 is a view in side elevation, a small portion of the device being broken away and other parts shown in vertical section;

Fig. 3 is an end view of the device as seen from its cutting end;

Fig. 4 is a vertical section taken on the line 4—4 of Fig. 3;

Fig. 5 is a vertical section taken on the line 5—5 of Fig. 3; and

Fig. 6 is a view in side elevation of a modified form of the device.

Referring to the drawings, the device comprises a tubular portion 7 having substantially half of its body portion cut-away as shown at 8, the sides of the portion 8 extending in a curve at the outer end thereof. The tube, at one end, is formed into a cylindrical portion 9 of larger diameter than the tube 7 and having its axis extending substantially at right angles to and intersecting the axis of tube 7. The cylindrical portion 9 has one closed side bent inward at its central portion, as shown at 10 and has its other side open. A cap member 11 is fitted over said open side and has its central portion bent inwardly, as shown at 12. The portions 9 and 11 thus form a handle with closed sides, which sides are substantially similar. While the tube and member 9 could be formed in various ways, in the embodiment of the invention illustrated, they are shown as formed from one single sheet, the tube thus being divided, as shown, along the longitudinal line 13. The tube 7, at its outer end is formed with oppositely extending helical portions 14 lying in the sides of the tube and a cutting edge 15 extends from the outer end of each of said portions 14 forming a point therewith and extending longitudinally of the tube 7 parallel to the axis thereof, said edges 15 thus also lying in the sides of the tube. Between the portions 14, the tube has lugs 16 extending inwardly thereof partially across the central opening therein and these lugs have sharpened or edge portions 17 at one end thereof. As shown in Figs. 4 and 5, the lugs 16 lie in planes inclined at an angle to the longitudinal axis of tube 7. It will be noted that the cutting edges 15 are reversely formed, as are also the cutting edges 17.

In operation, the fruit or vegetable to be operated upon which, in Fig. 1, is illustrated in dotted lines as an apple 18, will be held in one hand, such as the left hand of the operator, and the device will be grasped by its handle portion 9—10 in the other hand and the outer end of tube 7 forced into the fruit or vegetable, the device simultaneously being given a rotating motion. As the device is rotated in the object the edges 15 will cut a cylindrical piece from the object. The lugs 16 will also move through the said piece with a helical motion and will draw the device inward. The lugs 16 thus form advancing means for said tube. When the tool has been moved through the object to the desired distance the same will be drawn directly backwardly or outwardly. The lugs 16 will then contact the end of the piece cut and said piece will be drawn outwardly with the device. As the piece is cut from the object it moves into the tube and can readily be removed through the open side 8. If desired, the device may, of course, be moved all the way through the apple or other fruit. Where apples are to be baked, it is quite desirable to have a portion of the bottom of the apple intact, or, in other words, not to have the hole extend entirely through the apple. The apple can then be placed right side up on the cooking vessel and sugar and other flavoring or spicing material placed in the opening. The apples thus cored and arranged will retain the juices formed during the cooking operation. If the hole is made entirely through the apple these juices will run out into the cooking vessel and be lost. With the present device it is very easy to remove the core only to the desired distance. The handle formed by the members 9 and 11 makes a very convenient and comfortable handle to be gripped.

In Fig. 6, the device is shown adapted to be mounted upon a table or other support. Said device comprises a base portion 20 having a member 21 upstanding therefrom at one end and having formed therein a concave seat 22 having a gauge adapted to receive one end of the fruit, such as the apple 23 indicated in dotted lines. Members 24 also upstand from base 20 at its other end and are apertured to form bearings for a tube 25, said tube having a stop collar 26 at one end adjacent which is a crank handle 27. The tube 25 is also cut away at one side to form an open portion 25ª and while this cutaway portion could extend to the end of the tube it is shown as extending for only a portion of the length of said tube. The tube 25 is formed at its other end with portions 28 and 29 similar in all respects to the portions 14 and 16 described in connection with Figs. 1 to 5. The base member 20 may also carry a U-shaped clamp arm 30 carrying a clamping screw 31. A tongue 32 projects from inner bearing 24 down into tube 25 and forms an ejector.

In operating the device shown in Fig. 6, the member 20 will be placed on a table and preferably will be clamped thereon by disposing the lower side of the member 30 beneath the edge of the table and tightening the screws 31. The apple or other fruit 23 will now be placed with one end in the cavity 22 in gauge 21 which is concentric with the tube 25 and will be held against the member 21. The operator will now grasp the crank handle 27 with his other hand and will turn the tube 25. This motion will, owing to the lugs 28, move the tube longitudinally into the fruit 23. A piece will thus be cut from the fruit in the same manner already described, in connection with Figs. 1 to 5. The stop collar 26 is arranged to engage the outer bearing member 24 and stop the longitudinal movement of tube 25 before the cutting end thereof passes entirely through the apple or other fruit. The apple is thus cored but a portion is left uncored at the bottom end. When tube 25 is withdrawn tongue 32 will eject the cut-out piece through the end of tube 25. The device shown in Fig. 6 will have great utility in restaurants and other places where a large number of apples are to be handled.

From the above description it is seen that applicant has provided a very simple and efficient device for cutting pieces from or coring fruits and vegetables. The coring operation can be very quickly and easily performed. The device is easily and cheaply made from sheet metal and can be marketed at a very low price. The device has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A coring device for fruits and vegetables adapted to be rotatably advanced thereinto comprising a tube having a cutting edge lying in the side of said tube, and having an inwardly extending portion with a cutting edge inclined to the longitudinal axis of said tube and disposed an appreciable distance at one side of said axis.

2. A coring device for fruits and vegetables comprising a tube having a cutting edge lying in the side of said tube having oppositely disposed inclined helical end portions with longitudinally extending edges, and having inwardly extending lugs between said portions with substantially helical cutting edges thereon.

3. A coring device for fruits and vegetables adapted to be rotatably advanced thereinto comprising a tube having a cutting edge lying in the side of said tube having a helical end portion having a longitudinal edge and an inwardly bent portion adjacent thereto having a forward substantially helical cutting edge thereon disposed appreciable distance at one side of the axis of said tube.

4. A coring device for fruits and vegetables comprising a tube having helical end portions lying in the sides of said tube, said portions having longitudinally extending cutting edges forming points and having lugs bent inwardly of said tube inclined to the longitudinal axis of said tube and having front edged portions.

5. A coring device for fruits and vegetables comprising a tube having cutting edged portions in one end, a handle at its other end, a gauge for the article to be cored against which the fruit or vegetable abuts at the end opposite that to be cored, and a stop means for limiting the movement of said tube towards said gauge before its cutting end has passed entirely through said article.

6. A coring device for fruits and vegetables having in combination, a base member having upstanding gauging means at one end against which the fruit or vegetable abuts at its end opposite that to be cored, upstanding bearing portions at its other end, a tube journaled in said latter portions having a cutting edge at one end, a handle at the other end of said tube for turning the same, and a stop means arranged to stop longitudinal movement of said tube towards said gauging means before said cutting edge passes entirely through the article to be cored.

7. A coring device for a fruit or vegetable article, comprising a tube having a cutting edge at one end thereof, adapted to cut a core in such an article and an inwardly extending portion at said end of said tube, forming advancing means for said tube into the article and adapted to engage the inner end of the core cut into the article for removal.

In testimony whereof I affix my signature.

CHARLES D. McCARTHY.